(12) United States Patent
Kuriyama

(10) Patent No.: US 7,706,131 B2
(45) Date of Patent: Apr. 27, 2010

(54) SOLID ELECTROLYTIC CAPACITOR AND METHOD FOR MANUFACTURING SAME

(75) Inventor: Chojiro Kuriyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 285 days.

(21) Appl. No.: 11/791,568

(22) PCT Filed: Nov. 25, 2005

(86) PCT No.: PCT/JP2005/021685

§ 371 (c)(1),
(2), (4) Date: May 24, 2007

(87) PCT Pub. No.: WO2006/059546

PCT Pub. Date: Jun. 8, 2006

(65) Prior Publication Data

US 2008/0037201 A1 Feb. 14, 2008

(30) Foreign Application Priority Data

Nov. 30, 2004 (JP) .............................. 2004-346019

(51) Int. Cl.
*H01G 9/00* (2006.01)
(52) U.S. Cl. ...................... 361/523; 361/525; 361/528; 361/529; 361/540; 361/541
(58) Field of Classification Search .................. 361/523, 361/525–529, 532, 516–519
See application file for complete search history.

(56) References Cited

U.S. PATENT DOCUMENTS

| | | | |
|---|---|---|---|
| 6,400,556 B1 * | 6/2002 | Masuda et al. .............. | 361/523 |
| 6,661,645 B1 * | 12/2003 | Sakai et al. ................. | 361/523 |
| 6,775,127 B2 | 8/2004 | Yoshida | |
| 6,909,596 B2 * | 6/2005 | Shimoyama et al. ........ | 361/523 |
| 7,042,709 B2 * | 5/2006 | Kobayashi et al. .......... | 361/523 |
| 7,108,729 B2 | 9/2006 | Kanetake | |
| 7,352,561 B2 * | 4/2008 | Nakamura ................... | 361/523 |
| 7,359,180 B2 * | 4/2008 | Kurita et al. ................ | 361/528 |
| 7,365,963 B2 * | 4/2008 | Yoshihara et al. ........... | 361/540 |
| 2003/0170169 A1 | 9/2003 | Omori et al. | |
| 2003/0218859 A1 * | 11/2003 | Yoshida ....................... | 361/528 |
| 2006/0164792 A1 | 7/2006 | Ando | |

FOREIGN PATENT DOCUMENTS

| JP | 56-15815 | 12/1981 |
|---|---|---|
| JP | 2000-12387 | 1/2000 |

(Continued)

OTHER PUBLICATIONS

Japanese Office Action from the corresponding JP 2003-338433, mailed Feb. 26, 2008.

*Primary Examiner*—Nguyen T Ha
(74) *Attorney, Agent, or Firm*—Hamre, Schumann, Mueller & Larson, P.C.

(57) ABSTRACT

A solid electrolytic capacitor (A) includes a first porous sintered body (1A) made of valve metal, anode conduction members (21A, 21B) electrically connected to the first porous sintered body (1A), surface-mounting anode terminals (3A, 3B) electrically connected to the anode conduction members (21A, 21B), surface-mounting cathode terminals, and a second porous sintered body (1B) made of valve metal and intervening between the first porous sintered body (1A) and the anode conduction members (21A, 21B).

17 Claims, 21 Drawing Sheets

FOREIGN PATENT DOCUMENTS

| | | |
|---|---|---|
| JP | 2003-163137 | 6/2003 |
| JP | 2003-243263 | 8/2003 |
| JP | 2003-338433 | 11/2003 |
| JP | 2004-71634 | 3/2004 |
| WO | WO 02/093596 | 11/2002 |

\* cited by examiner

SOLID ELECTROLYTIC CAPACITOR AND METHOD FOR MANUFACTURING SAME

TECHNICAL FIELD

The present invention relates to a solid electrolytic capacitor including a porous sintered body of valve metal, and also to a method for manufacturing the same.

BACKGROUND ART

A solid electrolytic capacitor is used for removing noise generated in a device such as a CPU or for stabilizing power supply to an electronic apparatus (see e.g. Patent Document 1). FIG. 21 shows an example of such a solid electrolytic capacitor. The solid electrolytic capacitor X includes a porous sintered body 90 made of metal having a valve function. An anode wire 91, which is an example of anode conduction member, is provided to partially project from the porous sintered body 90. A conductive film 92 constituting a cathode is formed on the porous sintered body 90. Conductive members 93 and 94 are electrically connected to the anode wire 91 and the conductive layer 92, respectively. The conductive members 93 and 94 include portions exposed at a sealing resin 95, and the exposed portions serve as an anode terminal 93a and a cathode terminal 94a for surface mounting. Herein, the frequency characteristics of the impedance Z of a solid electrolytic capacitor are determined by the following formula 1.

$$Z = \sqrt{(R^2 + (1/\omega C - \omega L)^2)} \quad \text{Formula 1:}$$

In Formula 1, $\omega$ represents angular velocity, which is equal to $2\pi$ times the frequency, C represents capacitance of the solid electrolytic capacitor, R represents resistance, and L represents inductance. As will be understood from the formula, in a frequency region lower than the self-resonant frequency, $1/\omega C$ is the major determinant of the impedance Z. Therefore, the impedance can be reduced by increasing the capacitance C. In a high frequency region close to the self-resonant frequency, the resistance R is the major determinant. Therefore, to reduce the impedance, it is necessary to reduce the ESR (equivalent series resistance). Further, in an ultra high frequency region higher than the self-resonant frequency, $\omega L$ is the major dominant. Therefore, to reduce the impedance, it is necessary to reduce the ESL (equivalent series inductance).

Recently, from a device such as a CPU with a high clock frequency, high frequency noise including a harmonic component is generated. Further, in accordance with an increase in speed and digitalization of electronic devices, a power supply system capable of quickly responding to power demand is demanded. Therefore, for a solid electrolytic capacitor X to be used for these devices, a reduction in ESL is strongly demanded. For instance, as a means to reduce the ESL, it may be considered to make the porous sintered body 90 flat. However, as the porous sintered body 90 becomes flatter, the thickness of the porous sintered body 90 at a portion covering the anode wire 91 reduces. Therefore, when an external force is applied to the anode wire 91 in the process of manufacturing the solid electrolytic capacitor X, for example, the porous sintered body 90 may break and the anode wire 91 may drop from the porous sintered body 90. In this way, when the thickness of the porous sintered body 90 is reduced to reduce the ESL, the bonding strength of the anode wire 90 becomes insufficient.

Patent Document 1: JP-A-2003-163137 (FIG. 15)

DISCLOSURE OF THE INVENTION

Problems to be Solved by the Invention

The present invention is proposed under the circumstances described above. It is, therefore, an object of the present invention to provide a solid electrolytic capacitor capable of enhancing the bonding strength of an anode conduction member while reducing the ESL. Another object of the invention is to provide a method for manufacturing such a solid electrolytic capacitor.

Means for Solving the Problems

To solve the above-described problems, the present invention takes the following measures.

According to a first aspect of the present invention, there is provided a solid electrolytic capacitor comprising a first porous sintered body made of valve metal, an anode conduction member electrically connected to the first porous sintered body, a surface-mounting anode terminal electrically connected to the anode conduction member, a surface-mounting cathode terminal, and a second porous sintered body made of valve metal and intervening between the first porous sintered body and the anode conduction member.

In a preferred embodiment of the present invention, the second porous sintered body contains NbO.

In a preferred embodiment of the present invention, the second porous sintered body further contains Nb.

In a preferred embodiment of the present invention, the average particle size of the second porous sintered body is smaller than the average particle size of the first porous sintered body.

In a preferred embodiment of the present invention, the anode conduction member is made of valve metal.

In a preferred embodiment of the present invention, the anode conduction member includes an attachment portion in the form of a plate, and the attachment portion is attached to the first porous sintered body via the second porous sintered body.

In a preferred embodiment of the present invention, the first porous sintered body is formed with a recess, and the attachment portion is attached to the recess.

In a preferred embodiment of the present invention, the attachment portion is formed with a hole.

In a preferred embodiment of the present invention, an inner surface of the hole is covered with the second porous sintered body.

In a preferred embodiment of the present invention, the attachment portion is covered with the second porous sintered body from the inner surface of the hole up to a surface which is opposite from the first porous sintered body.

In a preferred embodiment of the present invention, the first porous sintered body is formed with a projection extending into the hole of the attachment portion.

In a preferred embodiment of the present invention, the attachment portion includes a serrated edge.

In a preferred embodiment of the present invention, the first porous sintered body has a flat shape having a thickness which is smaller than a width in a direction perpendicular to the thickness direction. The anode conduction member includes an extension which is in the form of a plate and connected perpendicularly to the attachment portion. The attachment portion is attached to a surface of the first porous sintered body which is oriented in a direction perpendicular to the thickness direction. The extension extends in a direction perpendicular to the thickness direction of the first porous sintered body, and the anode terminal is bonded to the extension.

In a preferred embodiment of the present invention, the first porous sintered body has a flat shape having a thickness which is smaller than a width in a direction perpendicular to the thickness direction. The anode conduction member includes an extension which is in the form of a plate and connected to the attachment portion to extend in the same direction as the attachment portion. The attachment portion is attached to a surface of the first porous sintered body which is oriented in the thickness direction. The extension extends in a direction perpendicular to the thickness direction of the first porous sintered body, and the anode terminal is bonded to the extension.

According to a second aspect of the present invention, there is provided a method for manufacturing a solid electrolytic capacitor. The method comprises the steps of preparing an intermediate product made of a porous body or porous sintered body of valve metal and attaching at least one anode conduction member made of valve metal to the intermediate product by using paste containing fine particles of valve metal, and sintering the intermediate product and the paste to make a first porous sintered body from the intermediate product and a second porous sintered body from the paste.

In a preferred embodiment of the present invention, the paste contains fine particles of NbO.

In a preferred embodiment of the present invention, the paste further contains fine particles of Nb.

In a preferred embodiment of the present invention, the average particle size of the fine particles contained in the paste is smaller than the average particle size of the porous body or the porous sintered body constituting the intermediate product.

In a preferred embodiment of the present invention, a plurality of anode conduction members each including an extension in the form of a plate are used. The extension dimension of the extension of at least one of the anode conduction members is larger than the extension dimension of extensions of other anode conduction members.

Other features and advantages of the present invention will become more apparent from the detailed description given below with reference to the accompanying drawings.

BEST MODE FOR CARRYING OUT THE INVENTION

Preferred embodiments of the present invention will be described below with reference to the accompanying drawings.

Figure 1:
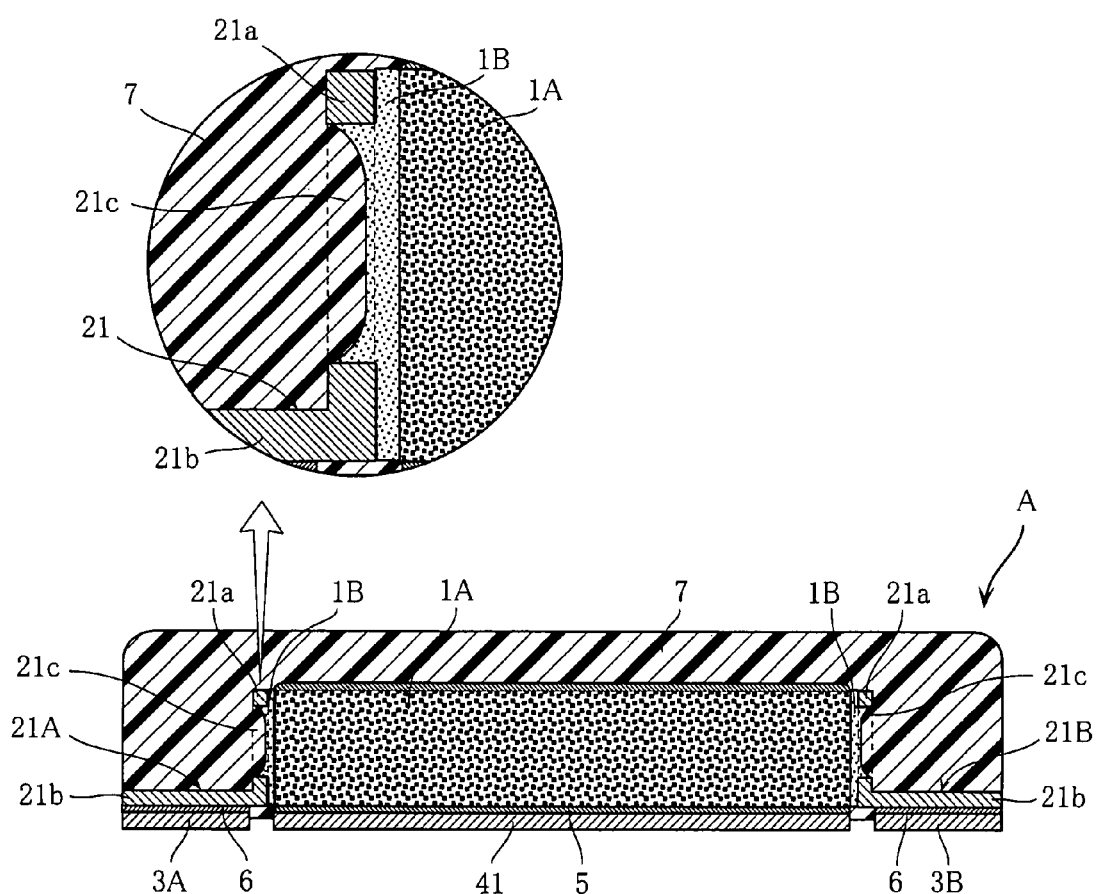
FIG. 1 is a sectional view showing a solid electrolytic capacitor according to a first embodiment of the present invention.
Figure 2:
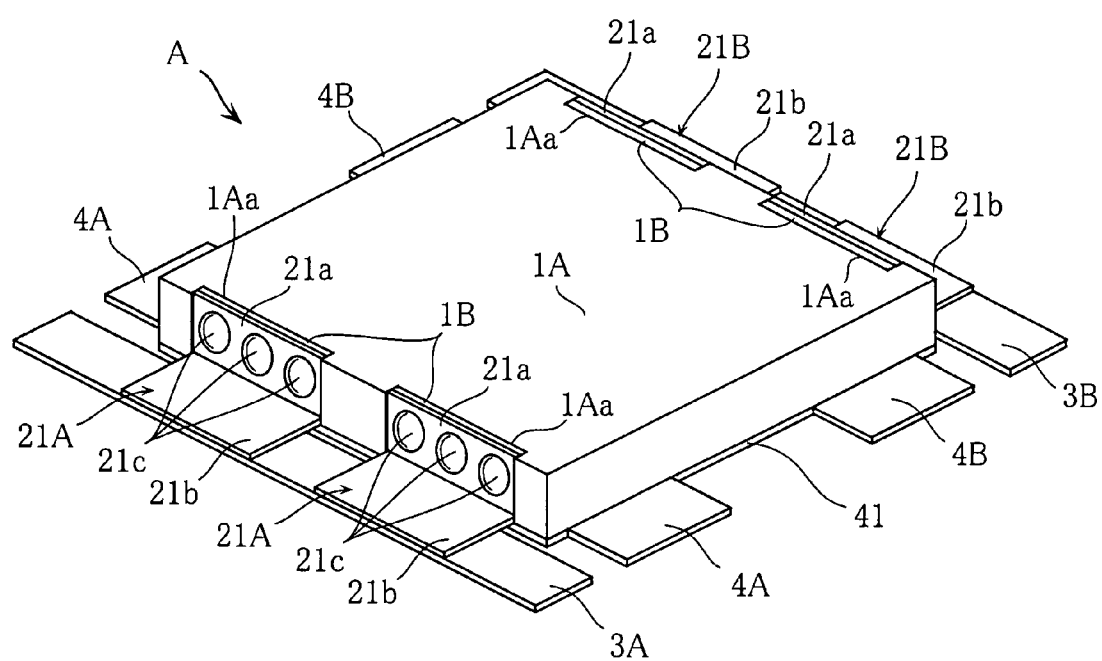
FIG. 2 is a perspective view showing a principal portion of the solid electrolytic capacitor according to the first embodiment of the present invention.

FIGS. 1 and 2 show a solid electrolytic capacitor according to a first embodiment of the present invention. As shown in FIG. 1, the solid electrolytic capacitor A in this embodiment includes a first porous sintered body 1A, second porous sintered bodies 1B, first and second anode conduction members 21A, 21B, anode terminals 3A, 3B, a cathode conduction member 41 and a sealing resin 7. In FIG. 2, the illustration of the sealing resin 7 is omitted.

As shown in FIG. 2, the first porous sintered body 1A is in the form of a flat rectangular plate having a thickness which is smaller than the width in the direction perpendicular to the thickness direction. The first porous sintered body 1A is formed by compacting powder of niobium (Nb) which is a valve metal and then sintering the compacted body. In the first porous sintered body 1A, the niobium particles are bonded to each other, with minute pores formed therebetween. On the surfaces of the particles, a dielectric layer (not shown) made of e.g. niobium pentoxide ($No_2O_5$) is formed. On the dielectric layers, a solid electrolytic layer (not shown) is formed. The solid electrolytic layer is made of e.g. manganese dioxide or conductive polymer and preferably formed to fill the pores completely. As the material of the porous sintered body 1, any valve metal can be used, and for example, tantalum (Ta) may be used instead of niobium.

Four recesses 1Aa are formed at side surfaces of the first porous sintered body 1A. Two anode conduction members 21A and two anode conduction members 21B are attached to the recesses 1Aa via four second porous sintered bodies 1B.

Each of the second porous sintered bodies 1B is formed by sintering powder of niobium oxide (NbO) which is a valve metal. Similarly to the first porous sintered body 1A, each of the second porous sintered bodies 1B includes minute pores and is formed with a dielectric layer and a solid electrolytic layer. In this embodiment, the average particle size of the niobium oxide particles forming the second porous sintered bodies 1B is smaller than that of niobium particles forming the first porous sintered body 1A.

The two first anode conduction members 21A and the two second conduction members 21B are in the form of a generally L-shaped plate and made of niobium which is a valve metal. Each of the anode conduction members 21A, 21B includes an attachment portion 21a and an extension 21b which are connected perpendicularly to each other. The attachment portion 21a of each of the anode conduction members 21A, 21B is attached to the recess 1Aa of the first porous sintered body 1A via the second porous sintered body 1B. Each of the attachment portions 21a is formed with holes 21c. As shown in FIG. 1, each of the second porous sintered bodies 1B fills the space between the attachment portion 21a and the recess 1Aa and covers the inner surface of the holes 21c.

As shown in FIG. 1, each of the extensions 21b extends in a direction perpendicular to the thickness direction of the first porous sintered body 1A (extends in the right and left direction in the figure). The first anode terminal 3A is bonded to the lower surface in the figure of the extension 21b of the first anode conduction member 21A. The second anode terminal 3B is bonded to the lower surface in the figure of the extension 21b of the second anode conduction member 21B. Bonding of these portions may be performed via conductive resin 6, for example. As shown in FIG. 2, the first and the second anode terminals 3A and 3B are in the form of an elongated rectangle and made of copper, for example.

The cathode conduction member 41 is provided on the lower surface in the figure of the first porous sintered body 1A. The cathode conduction member 41 is bonded to the first porous sintered body 1A via a conductive layer 5, for example. The conductive layer 5 is formed by laminating a graphite layer and a silver paste layer on the solid electrolytic layer (not shown) formed on the surface of the first porous sintered body 1A. As shown in FIG. 2, the second conduction member 41 is formed with four extensions. The extensions provide two first cathode terminals 4A and two second cathode terminals 4B.

As shown in FIG. 1, the sealing resin 7 covers the porous sintered bodies 1, the anode conduction members 21A, 21B and so on to protect these parts. The sealing resin 7 may be formed by utilizing thermosetting resin such as epoxy resin. The respective lower surfaces of the first and the second anode terminals 3A, 3B and the respective lower surfaces of the first and the second cathode terminals 4A, 4B are exposed at the sealing resin 7 and utilized for surface mounting of the solid electrolytic capacitor A. In this way, by the provision of the first anode terminal 3A for inputting, the second anode terminal 3B for outputting, the first cathode terminal 4A for inputting and the second cathode terminal 4B for outputting, the solid electrolytic capacitor 4A is structured as a so-called four-terminal solid electrolytic capacitor.

An example of method for manufacturing the solid electrolytic capacitor A will be described below with reference to FIGS. 3-6.

Figure 3:
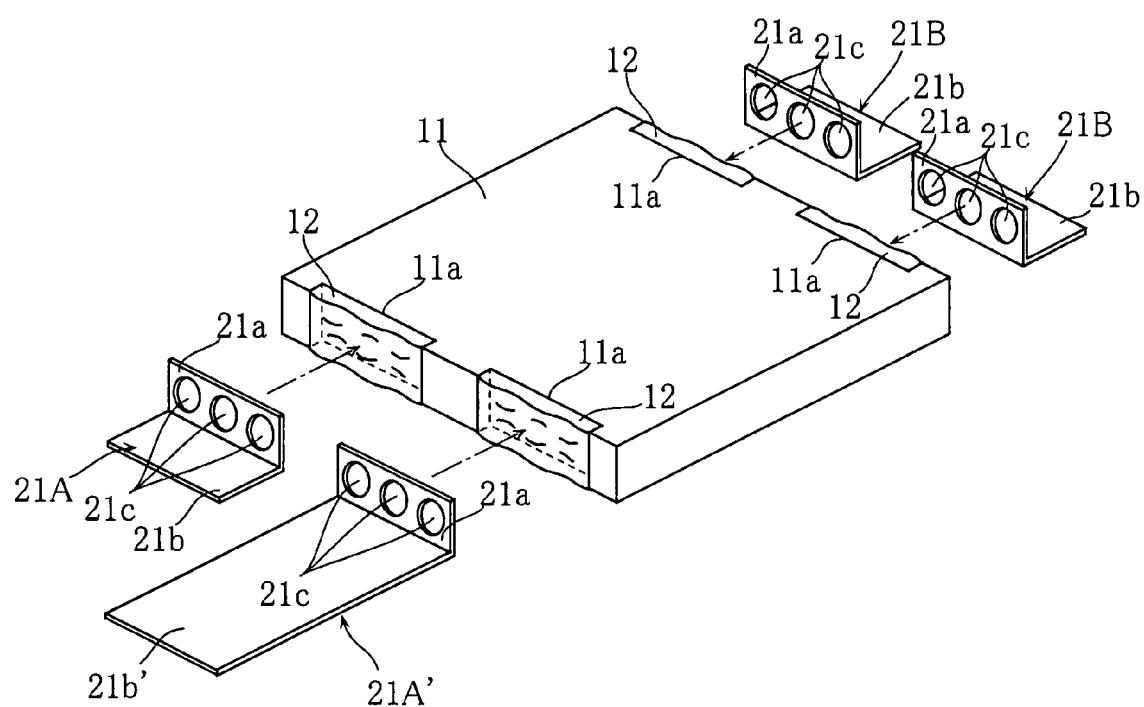
FIG. 3 is a perspective view showing a process step of attaching an anode conduction member in an example of method for manufacturing a solid electrolytic capacitor according to the present invention.

First, as shown in FIG. 3, a porous sintered body 11 of niobium is prepared. Specifically, fine particles of niobium (Nb) are loaded in a mold and compressed to form a porous body of niobium. Then, the porous body is sintered to obtain a porous sintered body 11. In this sintering process, the sintering temperature and the sintering time are so adjusted that the degree of sintering of the porous sintered body 11 be lower than the degree of sintering of the first porous sintered body 1A shown in FIG. 1. The porous sintered body 11 is an example of intermediate product of the first porous sintered body in the present invention.

After the porous sintered body 11 is formed, paste 12 is applied to the recesses 11a. The paste 12 is obtained by mixing fine particles of niobium oxide (NbO) with an organic, for example acrylic, solvent. Specifically, in this process, use is made of fine particles of niobium oxide whose average particle size is smaller than that of niobium particles used for forming the above-described porous body.

After the paste 12 is applied, anode conduction members 21A, 21A', 21B each of which is generally L-shaped are attached to the recesses 11a. Specifically, the anode conduction members 21A, 21A', 21B are attached by pressing the respective attachment portions 21a against the paste 12 in the recesses 11a. Each of the attachment portions 21a is formed with three holes 21c. Therefore, in this attachment process, the paste 12 is loaded into each of the holes 21c. The anode conduction members 21A, 21A', 21B include extensions 21b, 21b'. Of these extensions, the extension 21b' of the anode conduction member 21A' is longer than other extensions 21b. By leaving the anode conduction members 21A, 21A', 21B attached, the organic solvent contained in the paste 12 evaporates, so that solidification of the paste 12 progresses.

Figure 4:
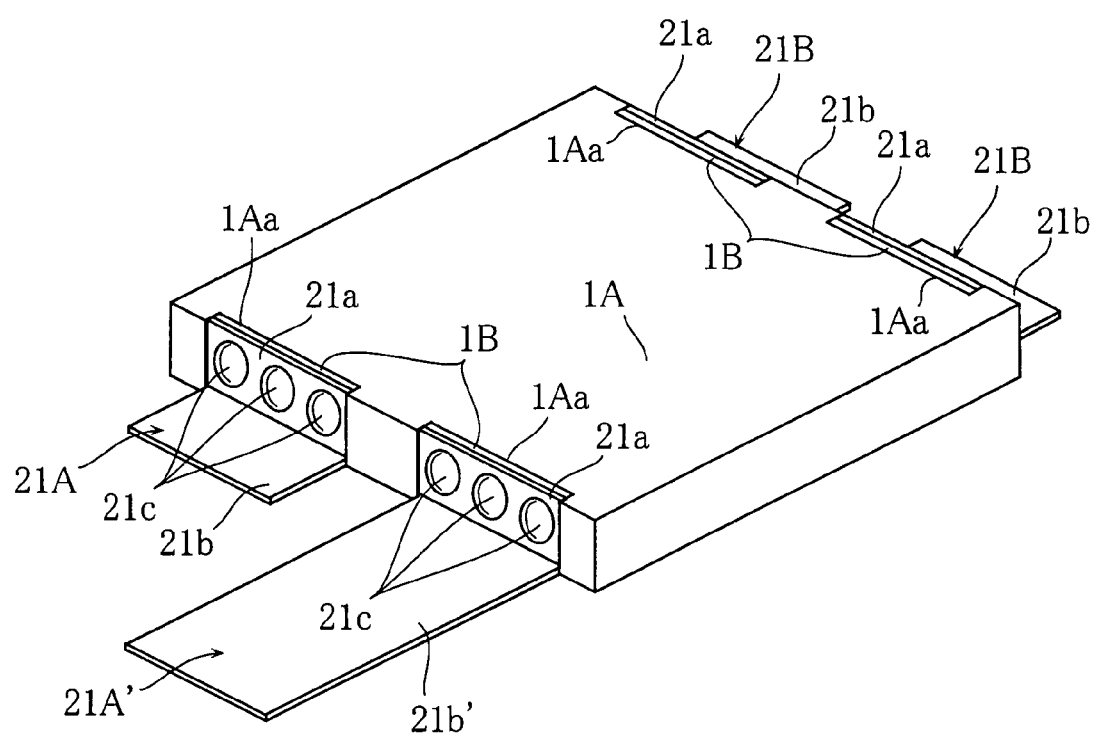
FIG. 4 is a perspective view showing the state after sintering is performed in the method for manufacturing a solid electrolytic capacitor according to the present invention.

Then, the porous sintered body 11 to which the anode conduction members 21A, 21A', 21B are attached is subjected to sintering again. Thus, including the sintering already performed as described above, the porous sintered body 11 is subjected to sintering twice. As a result, the porous sintered body 11 becomes the first porous sintered body 1A as shown in FIG. 4. In the paste 12 shown in FIG. 3, the organic solvent is further evaporated due to the sintering or decomposed due to high temperature. In the process of evaporation or decomposition of the organic solvent, the fine particles of niobium oxide contained in the paste 12 aggregate. Since the particles of niobium oxide have a relatively small average particle size, the particles are sufficiently sintered by the single sintering process. As a result, the paste 12 becomes the second porous sintered bodies 1B as shown in FIG. 4.

Niobium oxide is more brittle than niobium, and can be easily broken into fine particles having a small average particle size. The use of niobium oxide particles having a smaller average particle size makes it possible to form the second porous sintered body 1B at a lower sintering temperature. When the sintering temperature is low, the volume reduction in forming the first and the second porous sintered bodies 1A, 1B can be suppressed. Therefore, the separation of the second porous sintered bodies 1B is prevented at the attachment surface of the attachment portion 21a of the anode conduction members 21A, 21A', 21B. In addition to the niobium oxide particles, niobium particles may be mixed in the paste 12. By adding niobium, the sintering temperature can be further lowered even when the average particle size remains substantially the same.

Figure 5:
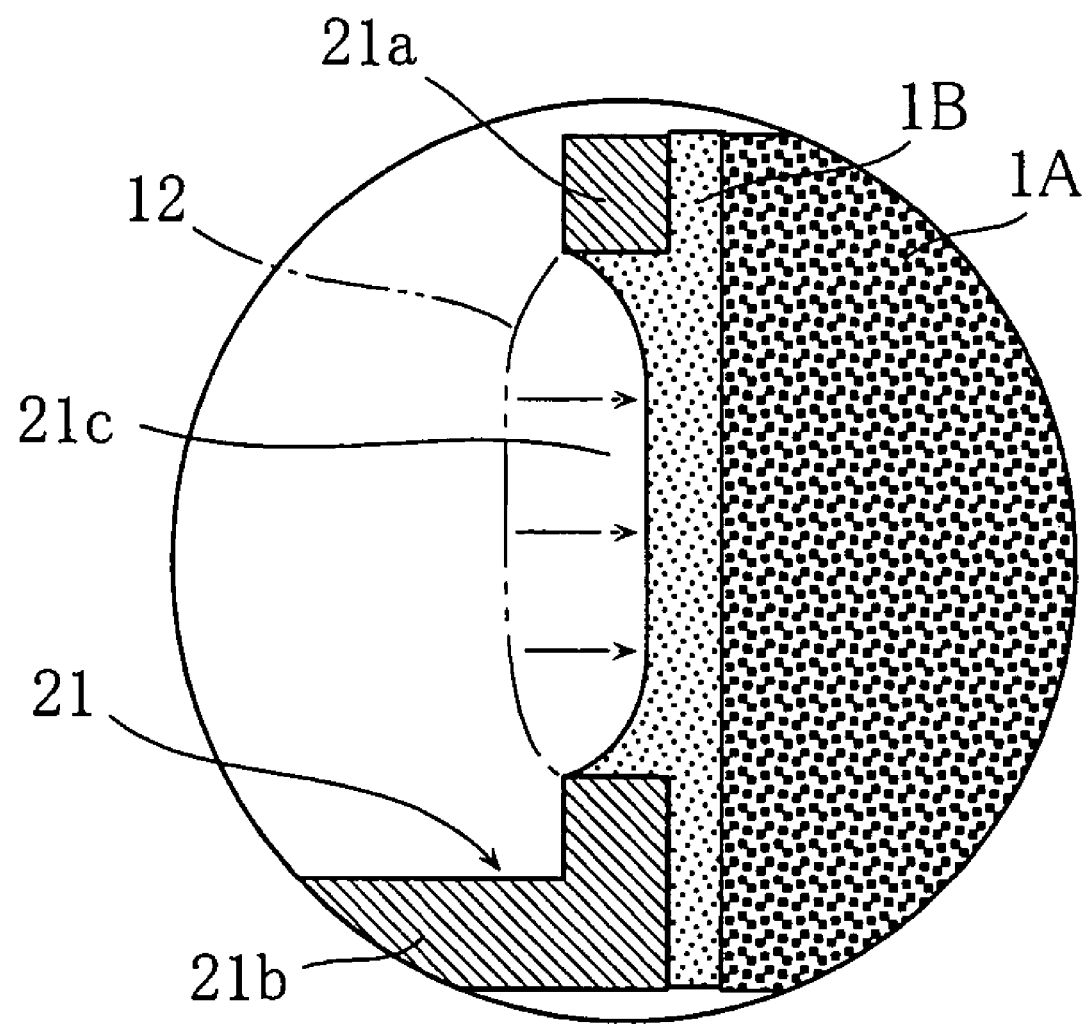
FIG. 5 is a sectional view showing a principal portion in a process step of forming a second porous sintered body in the method for manufacturing a solid electrolytic capacitor according to the present invention.

As shown in FIG. 5, the holes 21c are filled with the paste 12. Since each of the second porous sintered bodies 1B is formed by the process of evaporation and sintering as noted above, the volume thereof becomes smaller than that of the paste 12. As a result, the second porous sintered body 1B covers the inner surface of the holes 21a.

Unlike this embodiment, instead of the porous sintered body 11, a porous body before sintering may be employed as the intermediate product of the first porous sintered body 1A. In this instance, sintering is performed only once after the anode conduction members 21A and 21B are attached.

After the first and the second porous sintered bodies 1A and 1B are formed, a dielectric layer (not shown) and a solid electrolytic layer (not shown) are formed on the first and the second porous sintered bodies 1A and 1B. Specifically, to form a dielectric layer, with the extension 21b' of the anode conduction member 21A' shown in FIG. 4 held, the first and the second porous sintered bodies 1A and 1B are immersed in a formation liquid such as an aqueous solution of phosphoric acid. By this process, the first and the second porous sintered bodies 1A and 1B are subjected to anodic oxidation, whereby a dielectric layer made of niobium pentoxide ($Nb_2O_5$) is formed. The solid electrolytic layer is formed by repetitively performing the immersion of the first and the second porous sintered bodies 1A and 1B in e.g. an aqueous solution of manganese nitrate and the subsequent baking of the first and the second porous sintered bodies after pulling out from the aqueous solution. Since the extension 21b' is longer than other extensions 21b, the extension 21b' is convenient for holding in performing the immersion.

Figure 6:
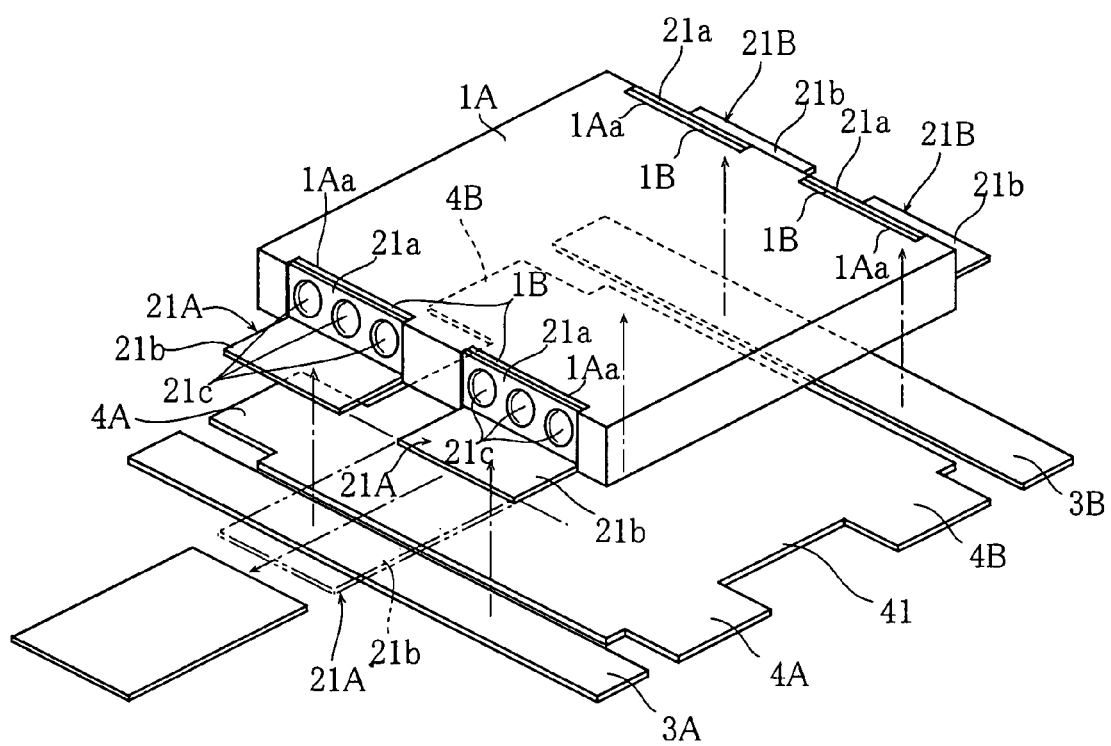
FIG. 6 is a perspective view showing a process step of attaching an anode terminal and a cathode conduction member in the method for manufacturing a solid electrolytic capacitor according to the present invention.

After the solid electrolytic layer is formed, a conductive layer 5 comprising e.g. a graphite layer and a silver paste layer is formed. In this process, as shown in FIG. 6, a cathode conduction member 41 is bonded to the lower surface of the first porous sintered body 1A via the conductive layer 5. Further, the extension 21b' of the anode conduction member 21A' is cut to have the same dimension as other extensions 21b. As a result, the anode conduction member 21A' becomes an anode conduction member 21A having an extension 21b. Then, a first anode terminal 3A and a second anode terminal 3B are bonded, via e.g. conductive resin, to the lower surfaces of the extensions 21b of the two first anode conduction members 21A and the two second anode conduction members 21B, respectively.

Thereafter, sealing resin 7 shown in FIG. 1 is formed by performing molding by using epoxy-based resin. As a result, a resin-packaged solid electrolytic capacitor A is obtained.

The advantages of the solid electrolytic capacitor A will be described below.

According to this embodiment, the ESL can be reduced, and the bonding strength of the anode conduction members 21A, 21B can be increased. Specifically, the flatter the first porous sintered body 1A is, the lower the inductance in the first porous sintered body 1A is, which is advantageous for reducing the ESL. Since the first porous sintered body 1A of this embodiment is in the form of a flat rectangular plate, the structure is suitable for reducing the ESL. Unlike this embodiment, there is a structure in which a metal wire is used as the anode conduction member, and part of the metal wire is embedded in the porous sintered body. With such a structure, it is difficult to embed the metal wire when the porous sintered body is made thin. Further, as the dimension difference between the diameter of the metal wire and the thickness of the porous sintered body reduces, the portion of the porous sintered body which covers the metal wire becomes thin. In the case where this portion is thin, the porous sintered body may be broken and the metal wire may drop when a force is applied to the metal wire. To solve such a problem, the metal wire may be made thinner. However, when the metal wire is made thinner, the resistance of the metal wire itself increases, which leads to an increase in the ESR of the entire solid electrolytic capacitor. According to this embodiment, the anode conduction members 21A, 21B are attached to the first porous sintered body 1A. Therefore, the first porous sintered body 1A is not broken even when the first porous sintered body 1A is made thin.

Further, as shown in FIG. 1, the extensions 21b of the anode conduction members 21A and 21B extend out in the right and left direction in the figure at the height substantially equal to the height of the lower surface of the first porous sintered body 1A. Therefore, the current path between the first and the second anode terminals 3A, 3B and the first porous sintered body 1A is generally flat and does not include a sharply rising portion. Therefore, the inductance in the current path is reduced, so that the ESL of the solid electrolytic capacitor A is reduced.

Since the second porous sintered bodies 1B are formed by using fine particles of niobium oxide, the first porous sintered body 1A and the anode conduction members 21A, 21B can be properly bonded together. As shown in FIG. 3, the porous sintered body 11 sintered in advance and particles of niobium oxide contained in the paste 12 have high affinity to each other. Further, since the anode conduction members 21A and 21B are made of niobium, the anode conduction members have high affinity to particles of niobium oxide contained in the paste 12 shown in FIG. 3. Moreover, in the sintering process for forming the second porous sintered bodies 1B, the sintering temperature is low and the sintering time is short because of the small average particle size. Therefore, the volume reduction of the paste 12 shown in FIG. 5 in turning into the second porous sintered bodies 1B can be suppressed. Therefore, in the process of forming the second porous sintered bodies 1B, the separation of the anode conduction members 21A, 21B due to the above-described volume reduction can be prevented.

As shown in FIG. 1, the inner surface of the hole 21c formed at the attachment portion 21a of each of the anode conduction members 21A, 21B is covered by the second porous sintered body 1B. Therefore, even when a force is applied to the anode conduction member 21A, 21B, a so-called anchoring effect is exhibited by the portion of the second porous sintered body 1B located in the hole 21c. Thus, the bonding strength of the anode conduction member 21A, 21B is advantageously increased. Further, the attachment portion 21a of the anode conduction member 21A, 21B is received in the recess 1Aa. Due to the combined effect of this structure and the above-described anchoring effect, the anode conduction member 21A, 21B is prevented from moving.

In this embodiment, by using niobium oxide particles having a smaller average particle size for forming the second porous sintered bodies 1B, the bonding strength of the anode conduction members 21A, 21B can be increased more effectively. Specifically, as shown in FIG. 5, in the case where the average particle size of niobium oxide particles is small, so-called van der Waals force (intermolecular force) is liable to act on the particles when the organic solvent contained in the paste 12 evaporates, whereby the particles strongly aggregate to each other. On the other hand, such an action causes the pores in the second porous sintered body 1B to shrink while increasing the density thereof. However, as shown in FIG. 1, the solid electrolytic capacitor A includes the first porous sintered body 1A having a considerably larger volume than that of the second porous sintered body. Therefore, by making the first porous sintered body 1A have sufficient pores, the capacitance of the solid electrolytic capacitor A can be increased properly.

FIGS. 7-20 show other examples of solid electrolytic capacitor according to the present invention. In these figures, the elements which are similar to those of the foregoing embodiment are designated by the same reference signs as those used for the foregoing embodiment, and the description thereof will be omitted appropriately.

Figure 7:
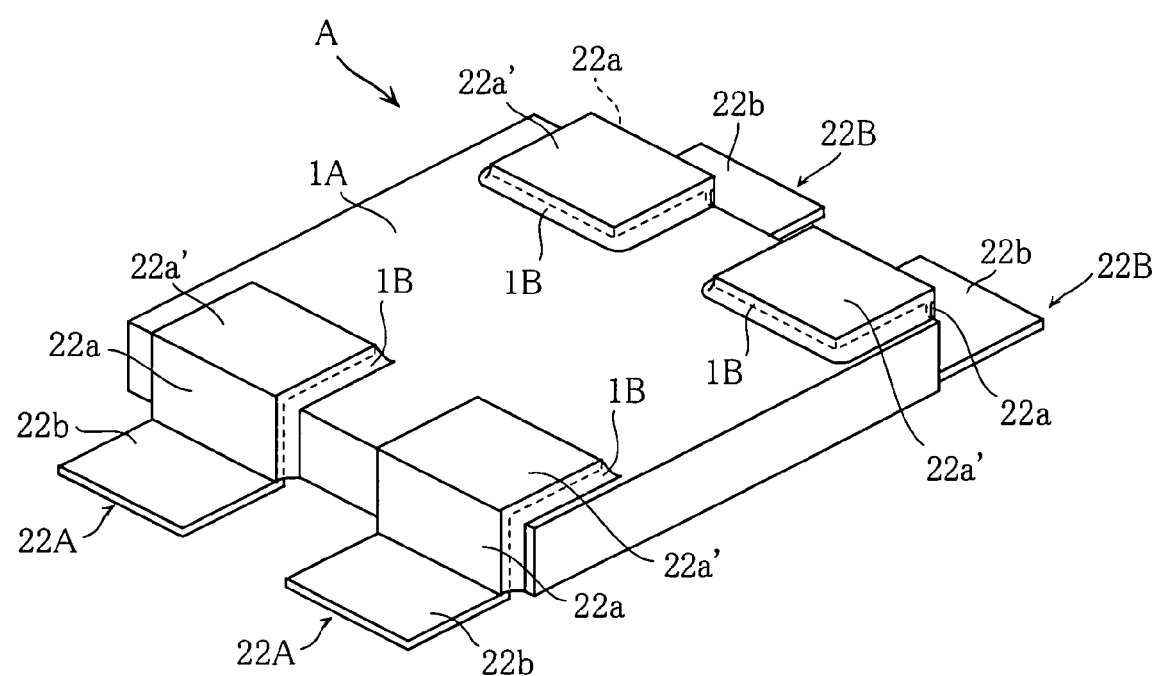
FIG. 7 is a perspective view showing a principal portion of a solid electrolytic capacitor according to a second embodiment of the present invention.

In the solid electric capacitor according to the second embodiment of the present invention shown in FIG. 7, the shape of the anode conduction members 22A, 22B differs from that of the anode conduction members 21A, 21B of the first embodiment. In this figure, the illustration of the anode and the cathode terminals and the sealing resin is omitted. Specifically, each of the anode conduction members 22A, 22B includes two right-angle portions. Of each of the anode conduction members 22A, 22B, the upper portion and the center portion in the figure serve as attachment portions $22a$ and $22a'$. The attachment portions $22a$ and $22a'$ are attached to the upper surface and a side surface in the figure of the first porous sintered body 1A via the second porous sintered body 1B.

According to this embodiment, a large attachment area can be provided between each of the anode conduction members 22A, 22B and the first porous sintered body 1A. Further, the attachment is performed in two directions by utilizing the attachment portions $22a$ and $22a'$ connected perpendicularly to each other. This structure is advantageous for increasing the bonding strength of the anode conduction members 22A, 22B.

Figure 8:
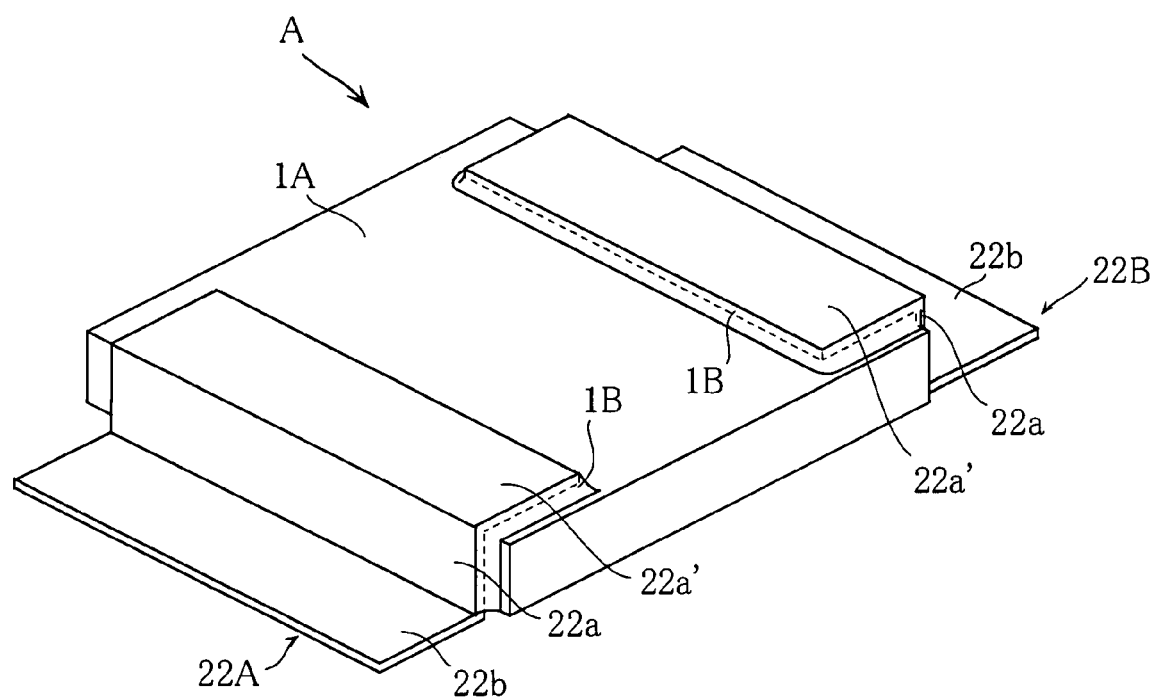
FIG. 8 is a perspective view showing a principal portion of a solid electrolytic capacitor according to a second embodiment of the present invention.

FIG. 8 shows a variation of the solid electrolytic capacitor according to the second embodiment of the present invention. In this embodiment, a single anode conduction member 22A and a single anode conduction member 22B each having a large width is used. According to this embodiment, the attachment area of the anode conduction members 22A, 22B is further increased.

Figure 9:
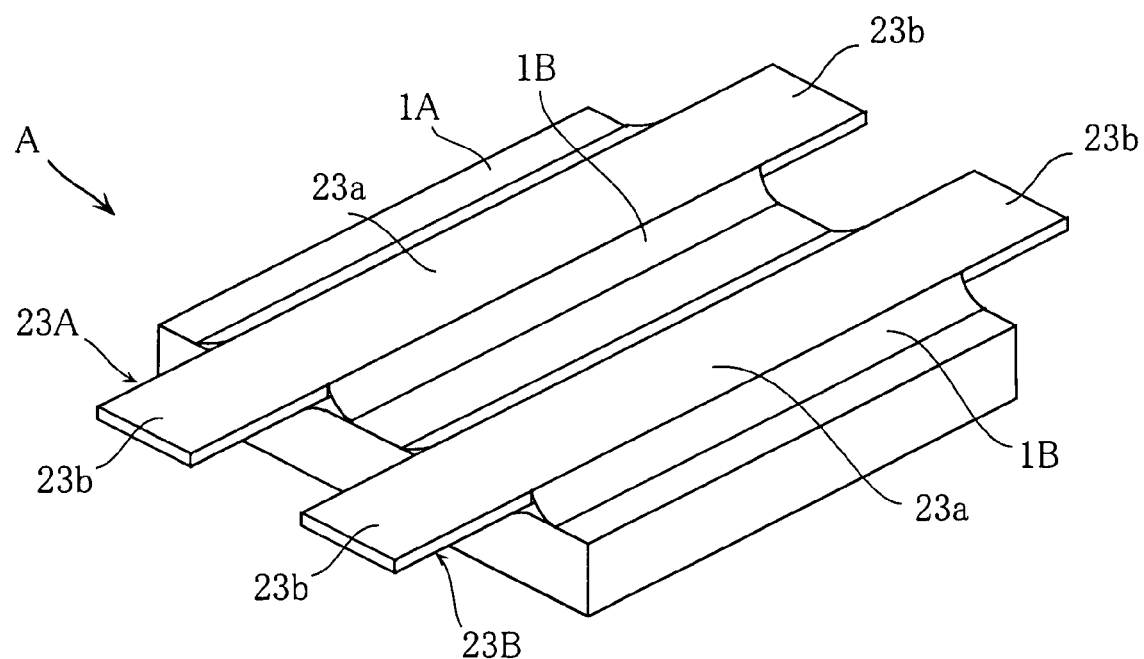
FIG. 9 is a perspective view showing a principal portion of a solid electrolytic capacitor according to a third embodiment of the present invention.

FIG. 9 shows a solid electrolytic capacitor according to a third embodiment of the present invention. In this embodiment, each of the anode conduction members 23A, 23B comprises a strip made of niobium. Of each of the anode conduction members 23A, 23B, the portion closer to the center serves as the attachment portion $23a$ and is attached to the upper surface of the first porous sintered body 1A. Each of the anode conduction members 23A, 23B includes extensions $23b$ extending in opposite directions from the attachment portion $23a$. The anode terminals (not shown) are bonded to the extensions.

According to this embodiment again, a reduction in the ESL and an increase in the bonding strength of the anode conduction members 23A and 23B can be achieved. The anode conduction members 23A and 23B in the form of a strip can be easily formed by cutting a flat plate of niobium, for example.

Figure 10:
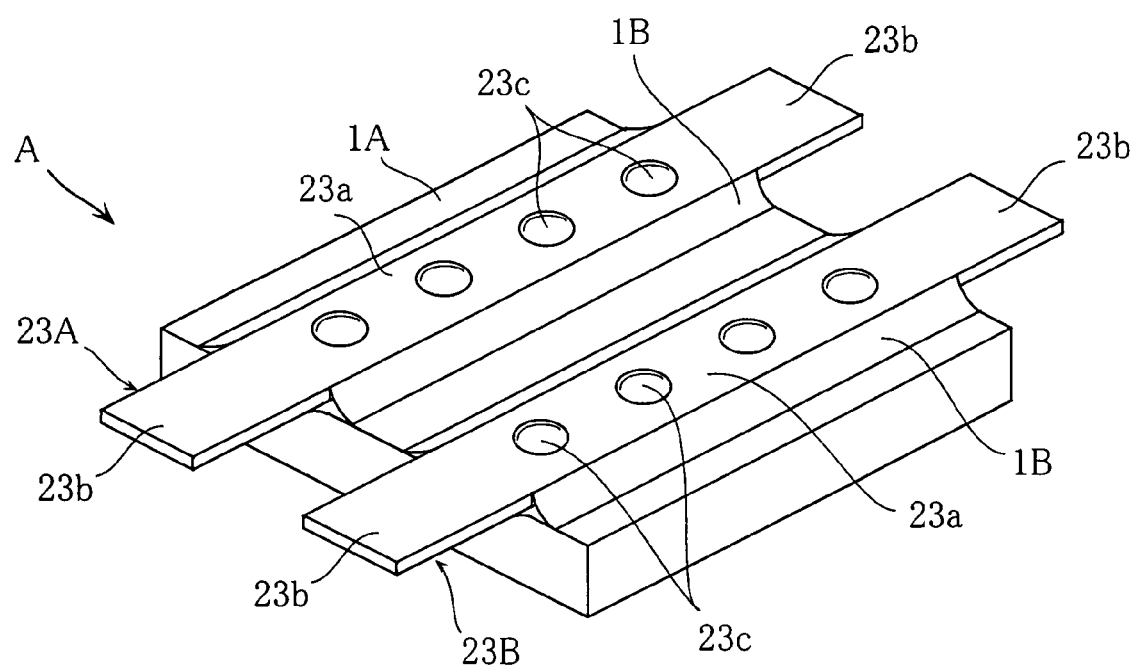
FIG. 10 is a perspective view showing a principal portion of a solid electrolytic capacitor according to a third embodiment of the present invention.

FIG. 10 shows a variation of the solid electrolytic capacitor according to the third embodiment of the present invention. In this embodiment, four holes $23c$ are formed in each of the anode conduction members 23A and 23B. With this structure, the so-called anchoring effect is properly exhibited, so that the bonding strength of the anode conduction members 23A and 23B can be further increased.

Figure 11:
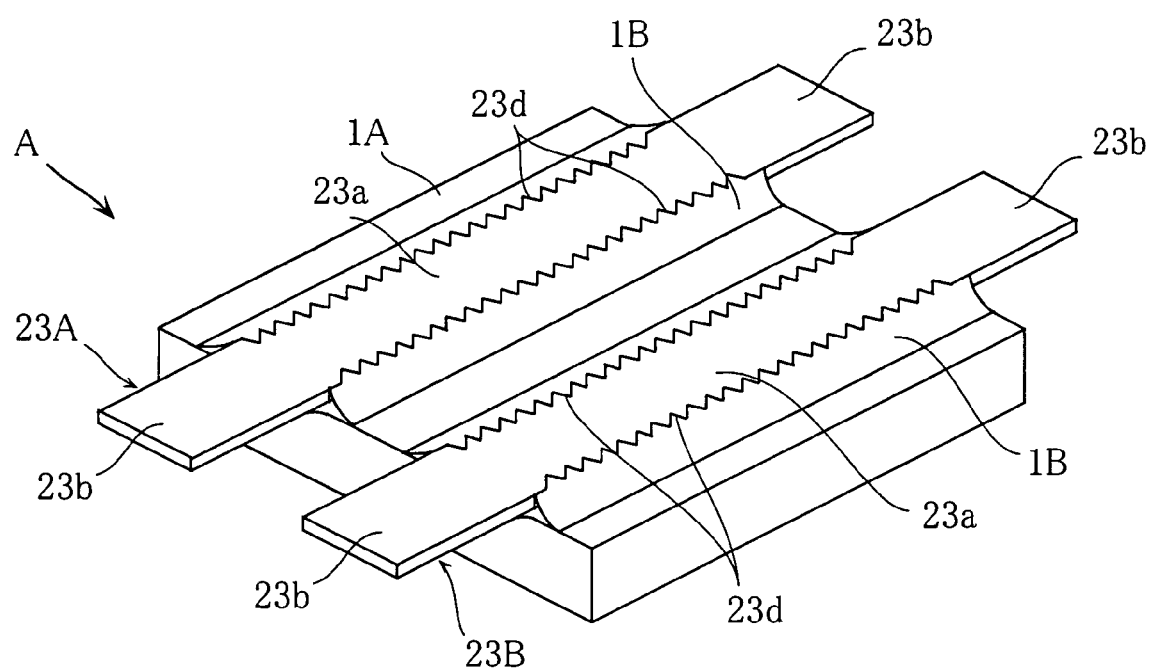
FIG. 11 is a perspective view showing a principal portion of a solid electrolytic capacitor according to a third embodiment of the present invention.

FIG. 11 shows another variation of the solid electrolytic capacitor according to the third embodiment of the present invention. In this embodiment, each of the anode conduction members 23A and 23B have serrated opposite edges $23d$ which are spaced from each other in the widthwise direction thereof. The edges $23d$ are covered by the second porous sintered bodies 1B. In this embodiment again, the anchoring effect is exhibited, so that the bonding strength of the anode conduction members 23A and 23B is enhanced.

Figure 12:
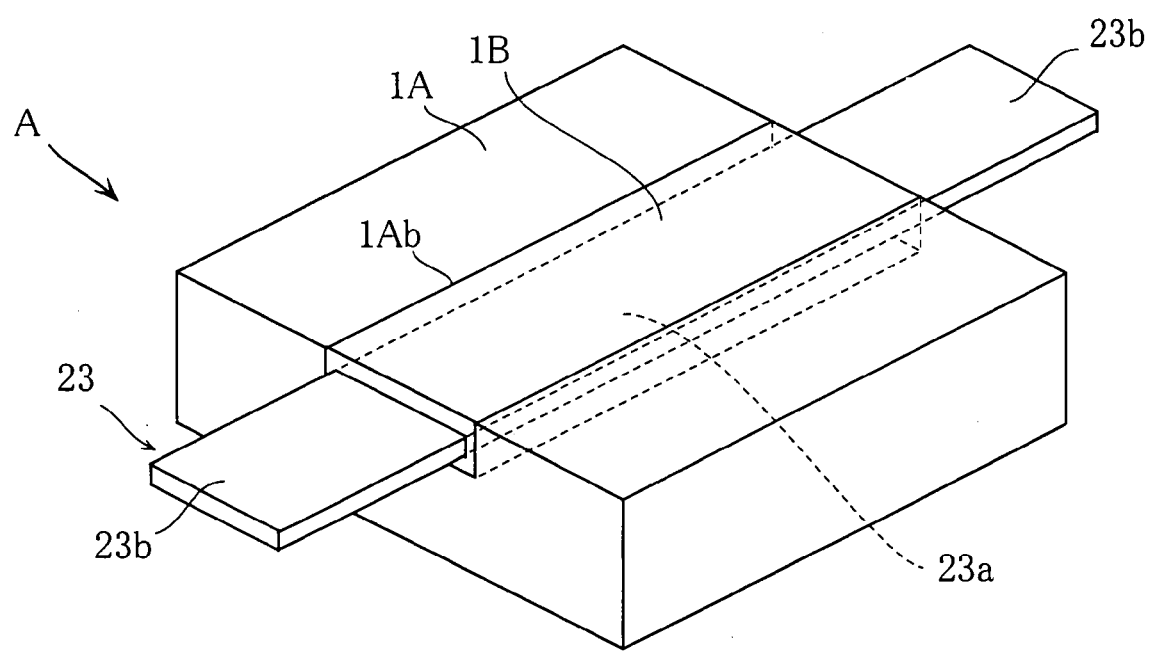
FIG. 12 is a perspective view showing a principal portion of a solid electrolytic capacitor according to a third embodiment of the present invention.

FIG. 12 shows another variation of the solid electrolytic capacitor according to the third embodiment of the present invention. In this embodiment, the attachment portion $23a$ of the anode conduction member 23 in the form of a strip is accommodated in a groove 1Ab formed at the first porous sintered body 1A. The spaces in the groove 1Ab other than the attachment portion $23a$ is filled with the second porous sintered body 1B. According to this embodiment, it is possible to arrange the attachment portion $23a$ so as not to project from the first porous sintered body 1A in the thickness direction while increasing the bonding strength of the anode conduction member 23. Therefore, the solid electrolytic capacitor A can be reduced in size.

Figure 13:
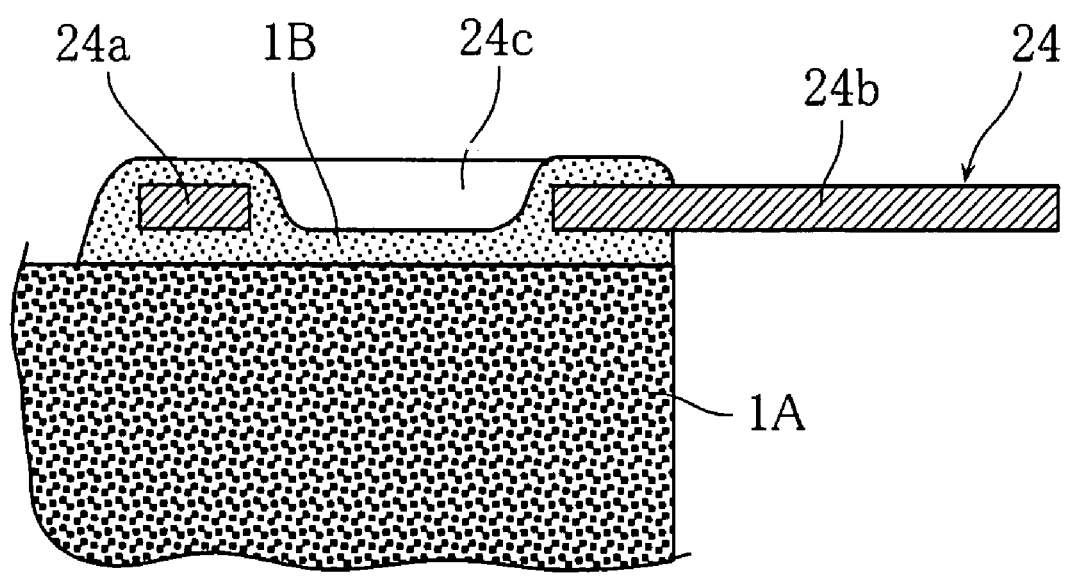
FIG. 13 is a sectional view showing a principal portion of a solid electrolytic capacitor according to a fourth embodiment of the present invention.

FIG. 13 shows a solid electrolytic capacitor according to a fourth embodiment of the present invention. In this embodiment, a hole $24c$ is formed at the attachment portion $24a$ of the anode conduction member 24 in the form of a flat plate. The second porous sintered body 1B is so formed as to continuously cover the inner surface of the hole $24c$ and the upper surface of the attachment portion $24a$ of the anode conduction member 24. According to this embodiment again, the bonding strength of the anode conduction member 24 can be increased.

Figure 14:
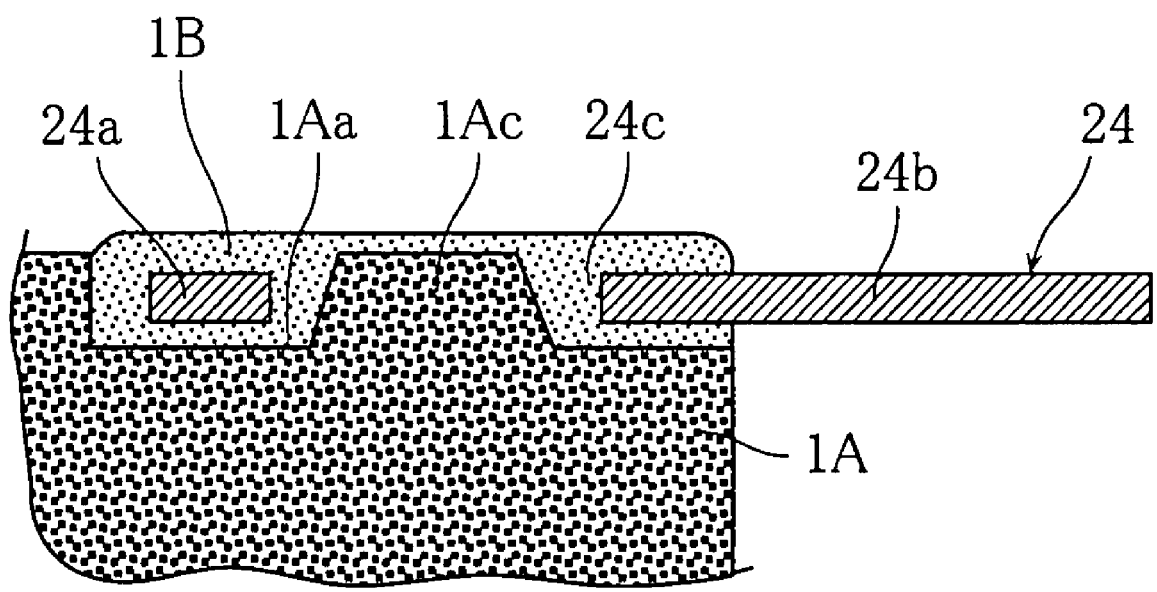
FIG. 14 is a sectional view showing a principal portion of a solid electrolytic capacitor according to a fourth embodiment of the present invention.
Figure 15:
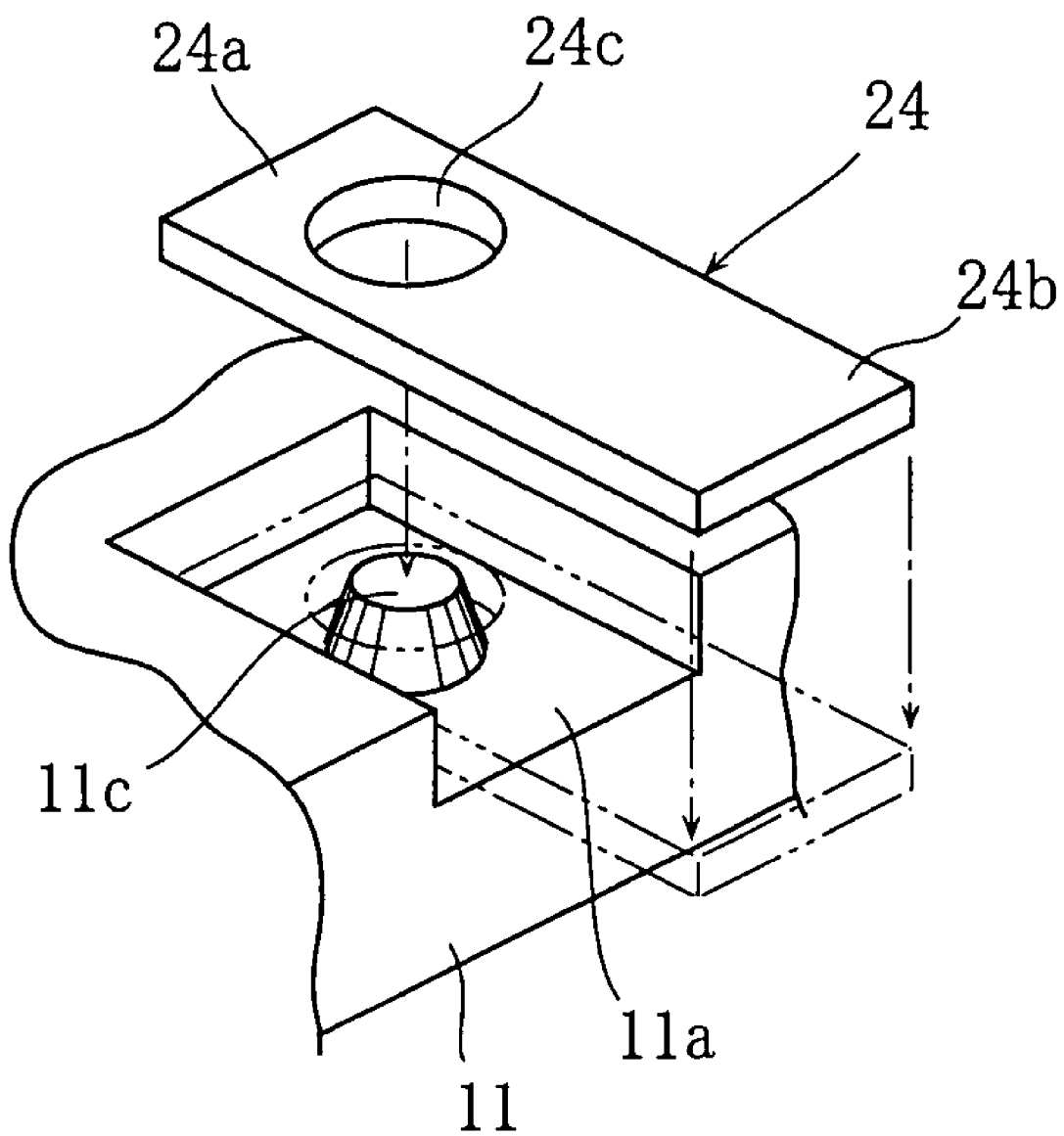
FIG. 15 is a perspective view showing a principal portion of a solid electrolytic capacitor according to a fourth embodiment of the present invention.

In the variation shown in FIG. 14, the first porous sintered body 1A is formed with a projection 1Ac extending into the hole $24c$. The projection 1Ac has a shape obtained by cutting the top of a cone. According to this embodiment, the anchoring effect is further increased. Further, as shown in FIG. 15, in the process of attaching the anode conduction member 24 to an intermediate product 11, centering effect can be exhibited by inserting the projection $11c$ into the hole $24c$. Therefore, the anode conduction member 24 can be more reliably attached to the correct position of the intermediate product 11.

Figure 16:
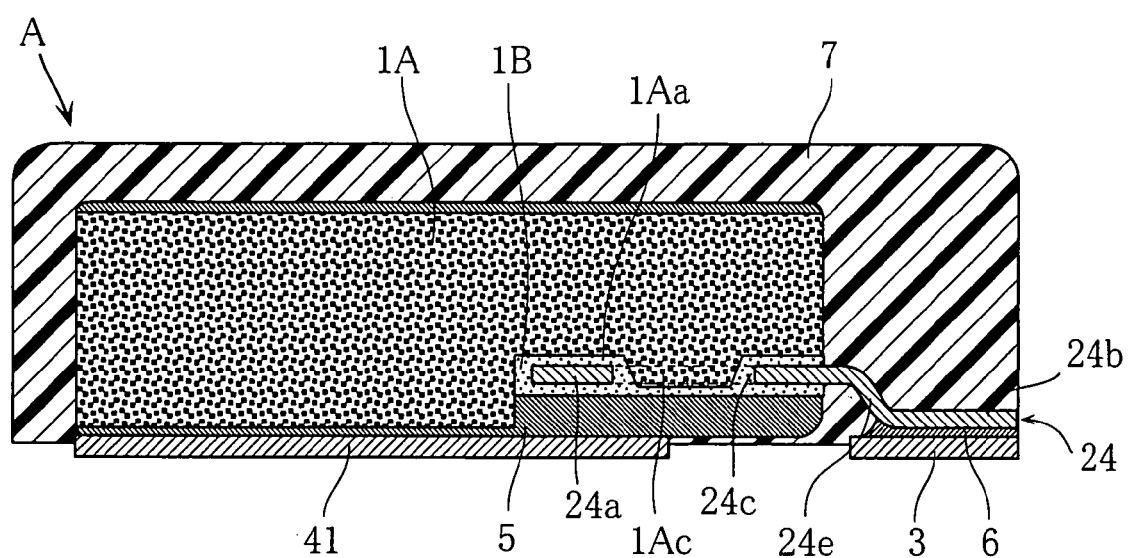
FIG. 16 is a sectional view showing a solid electrolytic capacitor according to a fourth embodiment of the present invention.

FIG. 16 shows an example of solid electrolytic capacitor having a bond structure which is similar to that of the embodiment shown in FIGS. 14 and 15. In this embodiment, a recess 1Aa is formed at the lower surface of the first porous sintered body 1A, and a projection 1Ac is provided at the bottom surface of the recess 1Aa. The projection 1Ac extends into a hole $24c$ formed at the anode conduction member 24. The projection 1Ac and the attachment portion $24a$ are covered by the second porous sintered body 1B. Further, a conductive layer 5 is loaded at a lower region of the recess 1Aa. Therefore, the lower surface of the first porous sintered body 1A is flat. Since the lower surface is flat, a cathode conductive member 41 having a relatively large size can be easily attached to the lower surface. Further, in this embodiment, the anode conduction member 24 includes a stepped portion $24e$. Therefore, the extension $24b$ is located at a lower position in the figure. As a result, the anode terminal 3 bonded to the extension $24b$ is flush with the cathode terminal (not shown) provided at the cathode conduction member 41. This structure is suitable for reducing the ESL.

Figure 17:
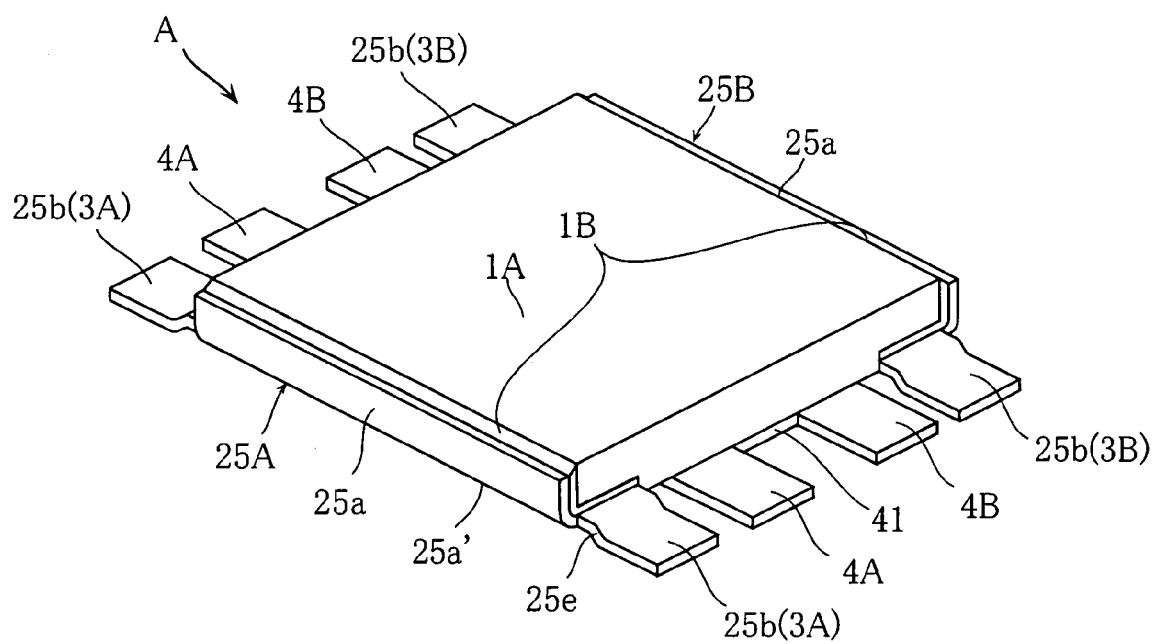
FIG. 17 is a perspective view showing a principal portion of a solid electrolytic capacitor according to a fifth embodiment of the present invention.

FIG. 17 shows a solid electrolytic capacitor according to a fifth embodiment of the present invention. In this embodiment, each of the anode conduction members 25A and 25B includes an attachment surface $25a$ which is upright and an attachment surface $25a'$ connected perpendicularly to the attachment surface $25a$. The attachment surfaces $25a$ and $25a'$ are attached to a side surface and the lower surface of the first porous sintered body 1A. Extensions 25b project from the attachment surface 25a'. Each of the extensions 25b includes a stepped portion 25e. As a result, the outer end portion of each extension 25b is flush with the cathode terminals 4A and 4B, and these portions serve as the anode terminals 3A and 3B. According to this embodiment, the anode terminals 3A, 3B and the cathode terminals 4A, 4B can be oriented in the same direction. This structure is advantageous for arranging the wiring pattern for mounting the solid electrolytic capacitor A in a compact manner.

Figure 18:
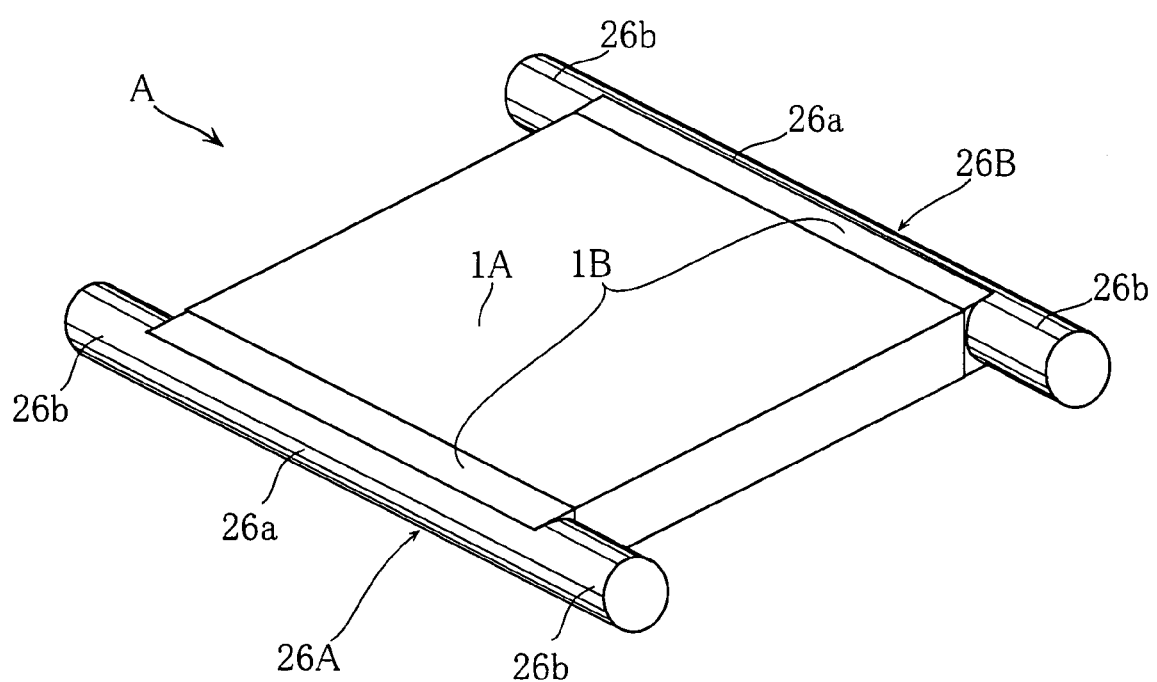
FIG. 18 is a perspective view showing a principal portion of a solid electrolytic capacitor according to a sixth embodiment of the present invention.
Figure 19:
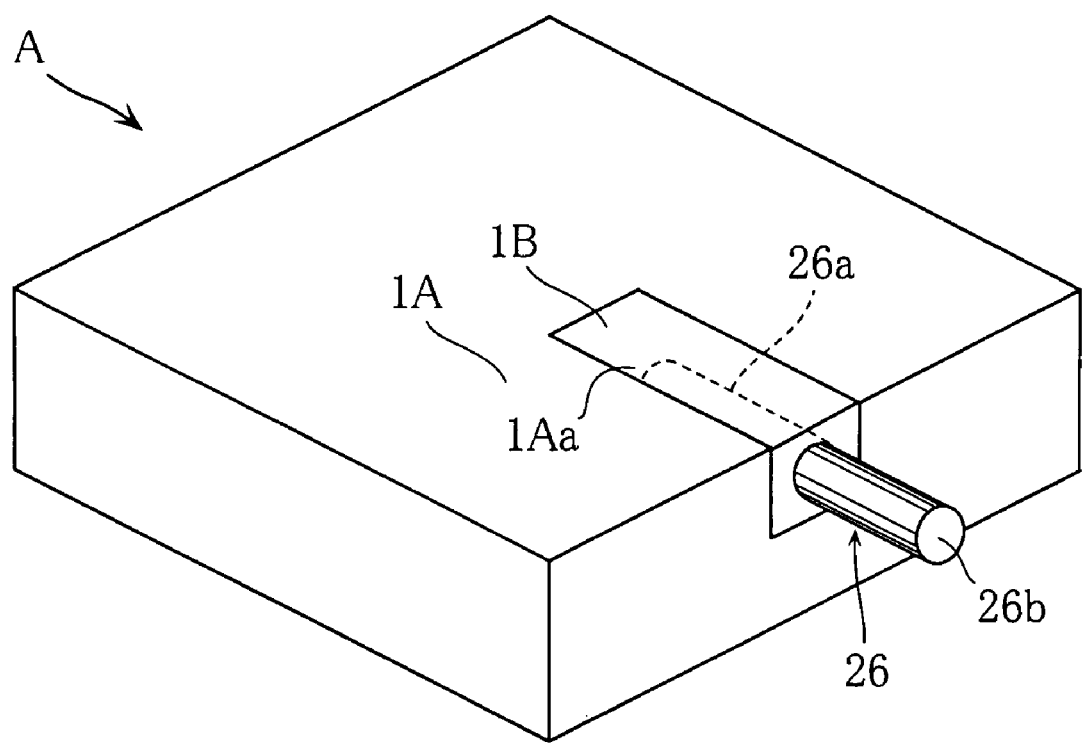
FIG. 19 is a perspective view showing a principal portion of a solid electrolytic capacitor according to a sixth embodiment of the present invention.
Figure 20:
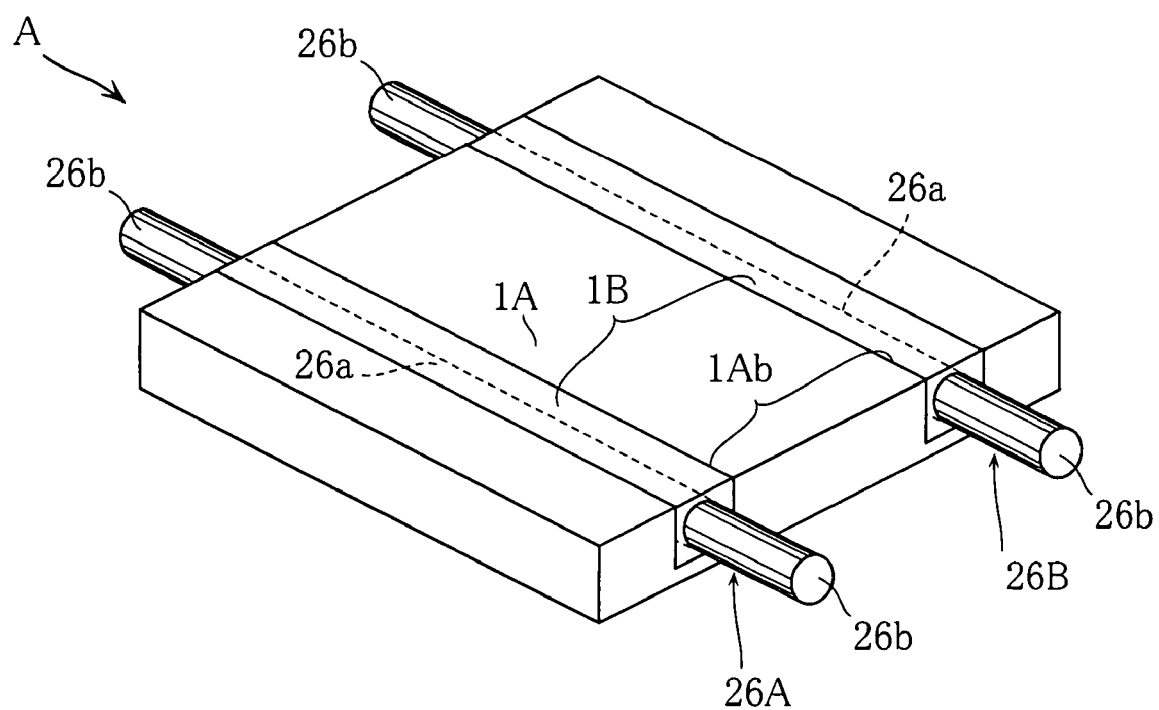
FIG. 20 is a perspective view showing a principal portion of a solid electrolytic capacitor according to a sixth embodiment of the present invention.
Figure 21:
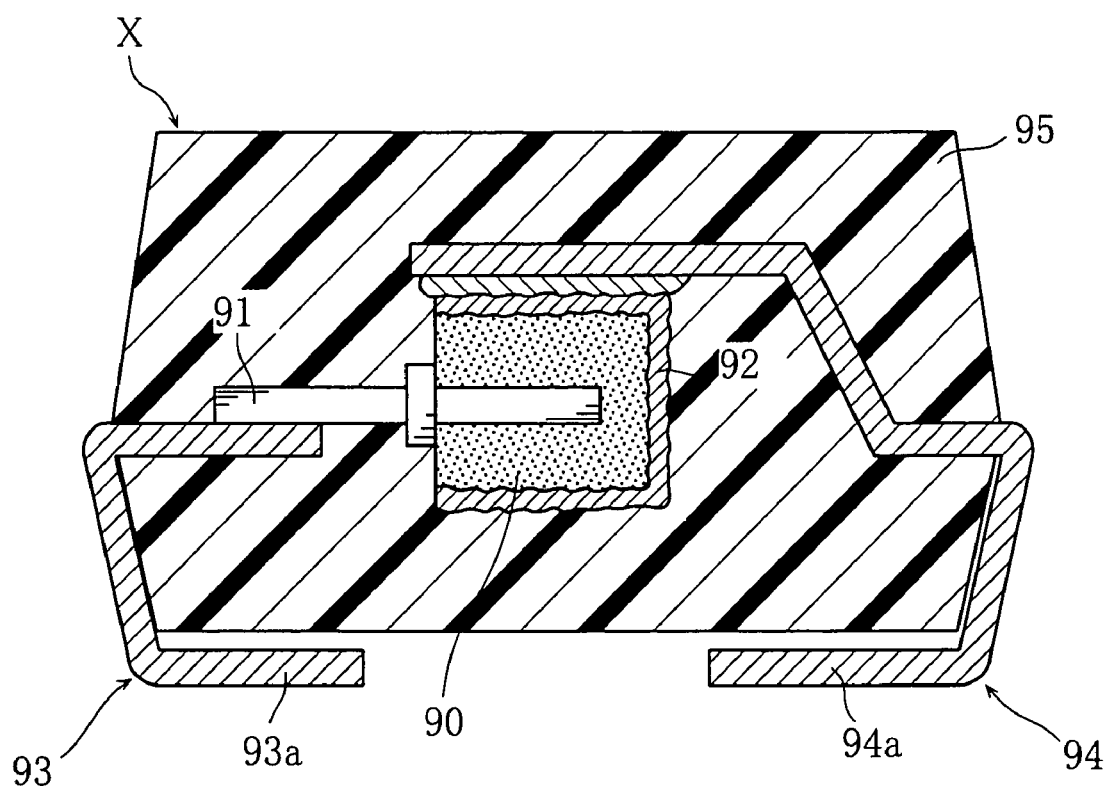
FIG. 21 is a sectional view showing an example of conventional solid electrolytic capacitor.

FIGS. 18-20 each shows a solid electrolytic capacitor according to a sixth embodiment of the present invention. These embodiments differ from the foregoing embodiments in that an anode wire is used as the anode conduction member.

In the embodiment shown in FIG. 18, anode wires 26A and 26B as the anode conduction members are attached to opposite side surfaces of the first porous sintered body 1A. The opposite ends of each anode wire 26A, 26B serve as extensions 26b of the present invention, to which an anode terminal (not shown) is bonded. The space between the anode wire 26A, 26B and the side surface of the first porous sintered body 1A is filled with the second porous sintered body 1B. This space is relatively large, because it is surrounded by an arcuate surface and a flat surface. In this embodiment, the second porous sintered body 1B is made of paste containing fine particles of niobium oxide. Therefore, the second porous sintered body 1B can closely fill the space, so that an undesirable void and so on is not formed. Therefore, the resistance between the first porous sintered body 1A and the anode wire 26A, 26B does not become unduly high, which is desirable for reducing the ESR of the solid electrolytic capacitor A.

In the embodiment shown in FIG. 19, part of the anode wire 26 extends into a recess 1Aa formed at the first porous sintered body 1A and covered by the second porous sintered body. According to this embodiment, it is not necessary to insert the anode wire 26 in advance in forming a porous body as an intermediate product of the first porous sintered body 1A. Therefore, the manufacturing efficiency is enhanced. Alternatively, like the embodiment shown in FIG. 20, each of the anode wires 26A, 26B may be so arranged as to penetrate a groove 1Ab formed at the first porous sintered body 1A.

The solid electrolytic capacitor according to the present invention is not limited to the foregoing embodiments. Specific structure of each part of the solid electrolytic capacitor according to the present invention may be varied in various ways.

As the material of the porous sintered body and the anode conduction member, any metal can be used as long as it has a valve action like niobium, niobium oxide or tantalum. The use of the solid electrolytic capacitor according to the present invention is not limited to a specific one.

The invention claimed is:

1. A solid electrolytic capacitor comprising:
a first porous sintered body made of valve metal;
an anode conduction member electrically connected to the first porous sintered body;
a surface-mounting anode terminal electrically connected to the anode conduction member;
a surface-mounting cathode terminal; and
a second porous sintered body made of valve metal and disposed between the first porous sintered body and the anode conduction member;
wherein the anode conduction member includes an attachment portion in a form of a plate, and
wherein the attachment portion is attached to the first porous sintered body via the second porous sintered body.

2. The solid electrolytic capacitor according to claim 1, wherein the second porous sintered body contains NbO.

3. The solid electrolytic capacitor according to claim 2, wherein the second porous sintered body further contains Nb.

4. The solid electrolytic capacitor according to claim 1, wherein an average particle size of the second porous sintered body is smaller than an average particle size of the first porous sintered body.

5. The solid electrolytic capacitor according to claim 1, wherein the anode conduction member is made of valve metal.

6. The solid electrolytic capacitor according to claim 1, wherein the first porous sintered body is formed with a recess, and wherein the attachment portion is attached to the recess.

7. The solid electrolytic capacitor according to claim 1, wherein the attachment portion is formed with a hole.

8. The solid electrolytic capacitor according to claim 7, wherein an inner surface of the hole is covered with the second porous sintered body.

9. The solid electrolytic capacitor according to claim 8, wherein the attachment portion is covered with the second porous sintered body from the inner surface of the hole up to a surface which is opposite from the first porous sintered body.

10. The solid electrolytic capacitor according to claim 7, wherein the first porous sintered body is formed with a projection extending into the hole of the attachment portion.

11. The solid electrolytic capacitor according to claim 1, wherein the attachment portion includes a serrated edge.

12. The solid electrolytic capacitor according to claim 1, wherein the first porous sintered body has a flat shape having a thickness which is smaller than a width in a direction perpendicular to the thickness direction;
wherein the anode conduction member includes an extension which is in a form of a plate and connected perpendicularly to the attachment portion;
wherein the attachment portion is attached to a surface of the first porous sintered body, the surface being oriented in a direction perpendicular to the thickness direction; and
wherein the extension extends in a direction perpendicular to the thickness direction of the first porous sintered body, and the anode terminal is bonded to the extension.

13. The solid electrolytic capacitor according to claim 1, wherein the first porous sintered body has a flat shape having a thickness which is smaller than a width in a direction perpendicular to the thickness direction;
wherein the anode conduction member includes an extension which is in a form of a plate and connected to the attachment portion to extend in a same direction as the attachment portion;
wherein the attachment portion is attached to a surface of the first porous sintered body, the surface being oriented in the thickness direction; and
wherein the extension extends in a direction perpendicular to the thickness direction of the first porous sintered body, and the anode terminal is bonded to the extension.

14. A method for manufacturing a solid electrolytic capacitor, the method comprising the steps of:
attaching an anode conduction member made of valve metal to an intermediate product by using a paste containing fine particles of valve metal, the intermediate product comprising a porous body or porous sintered body of valve metal; and
sintering the intermediate product and the paste to make a first porous sintered body from the intermediate product and a second porous sintered body from the paste;

wherein a plurality of anode conduction members each including an extension in a form of a plate are used; and wherein an extension dimension of the extension of at least one of the anode conduction members is larger than an extension dimension of extensions of other anode conduction members.

15. The method for manufacturing a solid electrolytic capacitor according to claim 14, wherein the paste contains fine particles of NbO.

16. The method for manufacturing a solid electrolytic capacitor according to claim 15, wherein the paste further contains fine particles of Nb.

17. The method for manufacturing a solid electrolytic capacitor according to claim 14, wherein an average particle size of the fine particles contained in the paste is smaller than an average particle size of the porous body or the porous sintered body constituting the intermediate product.

* * * * *